(12) United States Patent
Ashida et al.

(10) Patent No.: US 8,280,960 B2
(45) Date of Patent: Oct. 2, 2012

(54) GAME SYSTEM, GAME TERMINAL THEREFOR, AND SERVER DEVICE THEREFOR

(75) Inventors: Hiroyuki Ashida, Tokyo (JP); Shintaro Osato, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 870 days.

(21) Appl. No.: 12/374,098

(22) PCT Filed: Jul. 20, 2007

(86) PCT No.: PCT/JP2007/064360
§ 371 (c)(1),
(2), (4) Date: Jan. 16, 2009

(87) PCT Pub. No.: WO2008/013117
PCT Pub. Date: Jan. 31, 2008

(65) Prior Publication Data
US 2010/0029388 A1    Feb. 4, 2010

(30) Foreign Application Priority Data
Jul. 26, 2006    (JP) ................................. 2006-202671

(51) Int. Cl.
*G06F 15/16* (2006.01)
(52) U.S. Cl. ........................................ 709/205; 709/226
(58) Field of Classification Search .................. 709/205
See application file for complete search history.

(56) References Cited

U.S. PATENT DOCUMENTS

| | | | |
|---|---|---|---|
| 5,838,909 A | 11/1998 | Roy et al. | |
| 6,038,599 A | 3/2000 | Black et al. | 709/223 |
| 6,343,320 B1 * | 1/2002 | Fairchild et al. | 709/224 |
| 6,697,869 B1 | 2/2004 | Mallart et al. | 709/231 |
| 7,124,410 B2 | 10/2006 | Berg et al. | |
| 7,543,052 B1 | 6/2009 | Cesa Klein | |
| 7,602,808 B2 | 10/2009 | Ullmann et al. | |
| 7,610,330 B1 | 10/2009 | Quinn et al. | |
| 7,702,723 B2 | 4/2010 | Dyi | |
| 7,729,286 B2 | 6/2010 | Mishra | |

(Continued)

FOREIGN PATENT DOCUMENTS
EP    0 988 878 A2    3/2000
(Continued)

OTHER PUBLICATIONS

Japan Patent Office. Machine translation of JP 2005-137812 A. Generated Nov. 28, 2011. pp. 1-36.*

(Continued)

*Primary Examiner* — Christopher Biagini
(74) *Attorney, Agent, or Firm* — Sughrue Mion, PLLC

(57) ABSTRACT

The present invention provides a game system 100, a game terminal 10, and a server device 40. Game system 100 allows players to play a game in a unit of a group constituting one game terminal 10 that has been selected as a parent node requiring a larger bandwidth during the game and at least two game terminals 10 that have been selected as child nodes requiring a smaller bandwidth during the game. The selection of the nodes is performed by server device 40. A parent node is selected from a game terminal 10 that has transmitted a grouping request containing ability data indicating that the terminal has the ability to be selected as a parent node.

5 Claims, 11 Drawing Sheets

U.S. PATENT DOCUMENTS

| | | | |
|---|---|---|---|
| 7,860,993 | B2 | 12/2010 | Chintala et al. |
| 7,907,598 | B2 | 3/2011 | Anislmov et al. |
| 7,925,756 | B1 | 4/2011 | Riddle |
| 7,941,482 | B2 | 5/2011 | Bates et al. |
| 7,941,804 | B1 | 5/2011 | Herington et al. |
| 2001/0044339 | A1 | 11/2001 | Cordero et al. |
| 2002/0018477 | A1 | 2/2002 | Katz |
| 2004/0139158 | A1 | 7/2004 | Datta .......................... 709/205 |
| 2006/0020700 | A1 | 1/2006 | Qiu et al. |
| 2006/0190654 | A1 | 8/2006 | Joy et al. |
| 2006/0205509 | A1 | 9/2006 | Hirota ............................. 463/40 |
| 2007/0294410 | A1 | 12/2007 | Pandya et al. |
| 2009/0271512 | A1 | 10/2009 | Jorgensen |
| 2010/0296511 | A1 | 11/2010 | Prodan et al. |
| 2011/0016224 | A1 | 1/2011 | Riley |
| 2011/0116461 | A1 | 5/2011 | Holt et al. |

FOREIGN PATENT DOCUMENTS

| | | |
|---|---|---|
| EP | 988878 A2 | 3/2000 |
| EP | 1 066 867 A2 | 1/2001 |
| EP | 1683557 A1 * | 7/2006 |
| JP | 2000-296273 A | 10/2000 |
| JP | 2005-137812 A | 6/2005 |
| JP | 2005137812 A | 6/2005 |
| JP | 2006-055312 A | 3/2006 |
| TW | 480857 | 3/2002 |
| TW | 200614040 | 5/2006 |
| WO | WO 97/47091 | 12/1997 |
| WO | WO 00/10663 | 3/2000 |
| WO | 01/57678 A1 | 9/2001 |
| WO | WO 2006/044565 A2 | 4/2006 |

OTHER PUBLICATIONS

Supplementary European Search Report and Opinion of Application No. 07791097.4, dated Jan. 4, 2010.

Supplementary European Search Report and Opinion of Application No. 07791102.2, dated Mar. 10, 2010.

Taiwanese Examination Opinion and Search Report for Application No. 096126959 dated Apr. 23, 2010 (English Translation is attached.).

Saha, Debanjan, et al., "A Service Platform for On-line Games," Proceedings of the $2^{nd}$ Workshop on Network and System Support for Games, May 2003, pp. 180-184.

Kim, Jaecheol, et al., "Traffic Characteristics of a Massively Multi-Player Online Role Playing Game," Proceedings of the $4^{th}$ ACM SIGCOMM Workshop on Network and System Support for Games, Oct. 2005, pp. 1-8.

Yaiche, Halkel, et al., "A Game Theoretic Framework for Bandwidth Allocation and Pricing in Broadband Networks," IEEE/ACM Transactions on Networking, vol. 8, No. 5, Oct. 2000, pp. 667-678.

Sheldon, Nathan, et al., "The Effect of Latency on User Performance in Warcraft III," Proceedings of the $2^{nd}$ Workshop on Network and System Support for Games, May 2003, pp. 3-14.

Wright, S. and Tischer, S., "Architectural Considerations in Online Game Services over DSL Networks," IEEE International Conference and Communications, vol. 3, Jun. 2004, pp. 1380-1385.

Bosser, Anne-Gwenn, "Massively Multi-Player Games: Matching Game Design with Technical Design," Proceedings of the 2004 ACM SIGCHI International Conference on Advances in Computer Entertainment Technology, Jun. 2004, pp. 20-24.

International Search Report of Application No. PCT/JP2007/064360, dated Oct. 9, 2007.

Saha, Debanjan, et al., "A Service Platform for On-line Gaines," Proceedings of the $2^{nd}$ Workshop on Network and System Support for Games, May 2003, pp. 180-184.

Yaiche, Haikel, et al., "A Game Theoretic Framework for Bandwidth Allocation and Pricing in Broadband Networks," IEEE/ACM Transactions on Networking, vol. 8, No. 5, Oct. 2000, pp. 667-678.

Wright, S. and Tischer, S., "Architectural Considerations in Online Game Services over DSL Networks," IEEE International Conference and Communications, vol. 3, Jun. 2004, pp. 20-24.

Bosser, Anne-Gwenn, "Massively Multi-Player Games: Matching Game Design with Technical Design," Proceedings of the 2004 ACM SIGCHI International Conference on Advances in Computer Entertainment Technology, Jun. 2004, pp. 263-268.

* cited by examiner

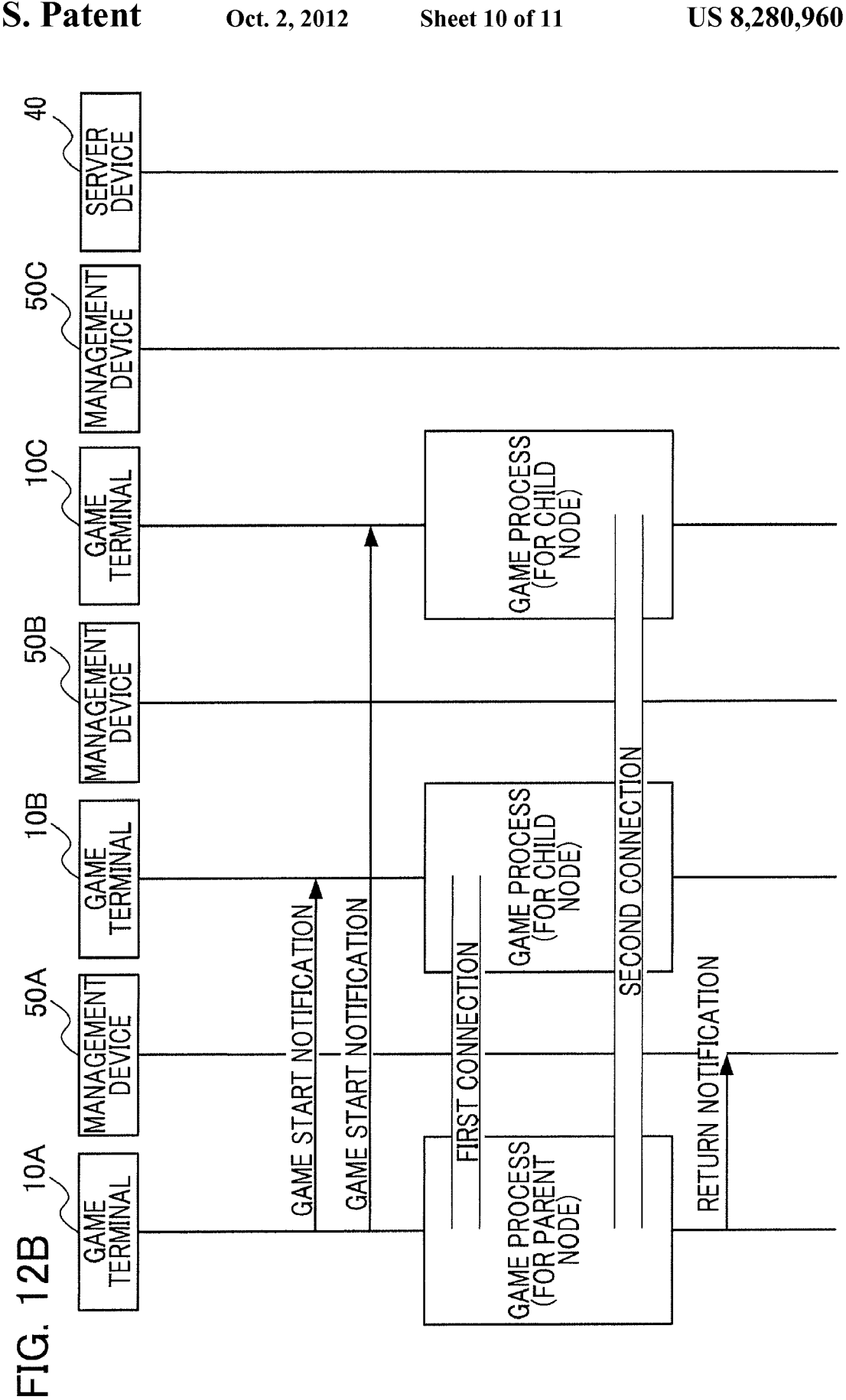

FIG. 13

| PARENT FIELD | FIRST CHILD FIELD | SECOND CHILD FIELD |
|---|---|---|
| COMMUNICATION ADDRESS OF GAME TERMINAL 10A | | |

FIG. 14

| PARENT FIELD | FIRST CHILD FIELD | SECOND CHILD FIELD |
|---|---|---|
| COMMUNICATION ADDRESS OF GAME TERMINAL 10A | COMMUNICATION ADDRESS OF GAME TERMINAL 10B | |

FIG. 15

| PARENT FIELD | FIRST CHILD FIELD | SECOND CHILD FIELD |
|---|---|---|
| COMMUNICATION ADDRESS OF GAME TERMINAL 10A | COMMUNICATION ADDRESS OF GAME TERMINAL 10B | |
| COMMUNICATION ADDRESS OF GAME TERMINAL 10C | | |

FIG. 16

| PARENT FIELD | FIRST CHILD FIELD | SECOND CHILD FIELD |
|---|---|---|
| COMMUNICATION ADDRESS OF GAME TERMINAL 10A | COMMUNICATION ADDRESS OF GAME TERMINAL 10B | COMMUNICATION ADDRESS OF GAME TERMINAL 10C |

GAME SYSTEM, GAME TERMINAL THEREFOR, AND SERVER DEVICE THEREFOR

TECHNICAL FIELD

The present invention relates to a game system, to a game terminal, and to a server device.

BACKGROUND ART

There is a widely used game system that allows three or more players to play one game via a network. A type of this game system advances a game as a unit for a group including a server, or one game terminal selected as a parent node (a server or master node) and two or more predetermined number of game terminals selected as child nodes (client or slave nodes). The communication band (bandwidth) required for the parent node during the game is large, whereas the bandwidth required for the child node is small.

In such a game system, a communication group including plural game terminals is usually provided in each venue, and a group of game terminals that will be used by players is formed across plural venues. Communication between game terminals is performed via a communication path allocated to each communication group (venue). A communication path is shared by game terminals belonging to a communication group that corresponds to the communication path. The amount of the bandwidth required in a communication path will be greatest in a case in which all the game terminals belonging to a communication group corresponding to the communication path are parent nodes. Therefore, communication failures (communication accidents, loss of packets, etc.) that are attributed to insufficient bandwidth in a communication path can be avoided if the bandwidth is allocated in an amount that is equal to or greater than the maximum bandwidth required for the communication path. Doing so, however, severely degrades the efficiency of use of the bandwidth because all the game terminals included in the same communication group simultaneously take the parent node on rare occasions.

Japanese Patent Application Laid-Open Publication No. 2005-137812 proposes a technique in which communication failures are minimized even in an environment in which the bandwidth of each communication path is smaller than the maximum amount of bandwidth required for each communication path. In this technique, game terminals are selected so that the burden is equal among communication groups. According to this technique, undesirable incidents can be avoided, such as a game terminal of a communication group being selected as a parent node, with the communication group corresponding to a communication path having a small amount of remaining bandwidth, or a game terminal of a communication group being selected as the child node, with the communication group corresponding to a communication path having a large amount of remaining bandwidth. Communication failures are therefore minimized.

In the above technique, however, communication errors cannot be completely avoided. To prevent communication failures, the bandwidth of an amount that is equal to or greater than the maximum bandwidth required for each communication path must be allocated as described above. Therefore, the most important challenge is to avoid the degradation in the use efficiency of the bandwidth. To solve this problem, minimizing the maximum amount of bandwidth required is effective. Designing a game so that the communication volume between game terminals is reduced is one way to minimize the maximum amount of bandwidth required. This method, however, degrades the degree of freedom in designing a game.

DISCLOSURE OF INVENTION

The present invention has as objects to provide a game system that allows the minimization of the maximum required bandwidth, without degrading the degree of freedom in designing a game, to provide a game terminal therefor, and to provide a server device therefor.

In the following, description will be given of the present invention. It should be noted that reference numerals in the attached drawings are shown in parentheses to facilitate understanding of the present invention; however, this is not intended to limit the present invention to the embodiments as shown in the drawings.

In one aspect, the present invention provides a game system (100) having: plural communication groups (5A, 5B, 5C, . . . ), each having been allocated different communication paths from one another and each including plural game terminals (10, 10, . . . ) sharing the communication path allocated to the respective communication groups; and a server device (40) that forms a player group of game terminals which will play a multiple-player game in a unit of a group by selecting, from among the plural game terminals (10, 10, . . . ) of the plural communication groups (5A, 5B, 5C, . . . ), one game terminal (10) as a parent node, requiring a larger amount of bandwidth during a game, and at least two game terminals as child nodes each requiring a smaller amount of bandwidth, each of the plural game terminals (10, 10, . . . ) of the plural communication groups (5A, 5B, 5C, . . . ) having: an inputter (14) that receives an instruction input by a player; a grouping request transmitter (11, 17) that generates, upon a predetermined instruction being input via the inputter (14), a grouping request for requesting the forming of the player group and that transmits the grouping request to the server device (40); a player group data receiver (11, 17) that receives player group data indicating the configuration of the player group; and a controller (11) that determines, on the basis of the player group data, whether the game terminal (10) has been selected as a parent node and that controls communication during the game based on a result of the determination; with the grouping request transmitter (11, 17) having: an entitlement determiner (11) that determines, upon receiving the predetermined instruction, whether the game terminal is entitled to function as a parent node; and a generator (11) that generates, in a case in which the entitlement determiner (11) has determined that the exercise of the entitlement is possible, the grouping request containing ability data indicating that the game terminal has an ability to be selected as a parent node and that otherwise generates the grouping request not containing the ability data; the server device (40) having: an ability detector (41, 42) that detects whether the grouping request contains the ability data upon receiving the grouping request; a selector (41) that selects, as a parent node, one of the game terminals (10) from among game terminals that have transmitted the grouping request containing the ability data and that selects at least two game terminals as child nodes from among game terminals that have transmitted the grouping requests other than the one game terminal (10) selected as the parent node; and a player group data transmitter (41, 42) that transmits, to each of the game terminals configuring the player group grouped through the selection by the selector (41), the player group data of the player group.

Specifically, the entitlement to function as a parent node includes the entitlement that a game terminal transmits a grouping request containing ability data and the entitlement that a game terminal operates as a parent node. Therefore, the exercise of the entitlement to function as a parent node includes a game terminal transmitting a grouping request containing ability data and operating as a parent node.

According to the game system, the maximum number of game terminals concurrently selected as a parent node in each communication group can be made smaller than the number of the plural game terminals (10, 10, . . . ) of the communication group, whereby the maximum required bandwidth can be minimized without reducing the freedom in designing a game.

There are various ways to determine whether the exercise of the entitlement is possible.

For example, a flag showing whether the entitlement can be exercised may be stored in each game terminal, so that, in an instance in which one game terminal begins exercising the entitlement, the flag stored in each of the other game terminals of a communication group including the game terminal exercising the entitlement is updated to that which shows that the entitlement cannot be exercised, and each game terminal may determine, based on the flag stored in the game terminal itself, whether the entitlement can be exercised.

Furthermore, the above game system (100) may have plural management devices (50) respectively provided for each of the communication groups (5A, 5B, 5C, . . . ), with each management device being capable of communicating with each of the plural game terminals (10, 10, . . . ) of a corresponding communication group (5A, 5B, 5C, . . . ), and in the game system, the entitlement determiner (11) of the game terminal may have: a transfer requester (11, 17) that transmits, to the management device (50) corresponding to a communication group (5A, 5B, 5C, . . . ) containing the game terminal (10), a transfer request for requesting the transfer of the entitlement so as to determine whether the game terminal can exercise the entitlement; and an entitlement obtainer (11, 17) that receives entitlement data indicating that the game terminal has the entitlement, and the entitlement determiner determines that the exercise is possible only in a case in which the entitlement obtainer (11, 17) receives the entitlement before a predetermined time has elapsed since the transmission of the transfer request, each of the plural management devices (50) having: an entitlement storage device (54) that indicates from information in memory the number of the entitlements held by the management device (50); a transfer request receiver (51, 52) that receives the transfer request; and a transfer processor (51, 52) that, upon the transfer request receiver (51, 52) receiving the transfer request, determines whether the information in the memory of the entitlement storage (54) indicates that there is at least one entitlement, that transmits the entitlement data to the game terminal (10) that has transmitted the transfer request in a case in which it is determined that there is at least one entitlement, and a transfer processor (51, 52) that updates the information in the memory of the entitlement storage (54) so that the number of the entitlements held by the management device (50) is reduced by 1. In this mode (hereinafter referred to as a "first mode"), the problem can be solved both in a case in which the number of the entitlements that can be exercised by the plural game terminals of each communication group is 1 and in a case in which the number is greater than 1.

The first mode includes a mode in which a game terminal concurrently serves as a management device. In the mode in which a game terminal concurrently serves as a management device, each game terminal will identify, before transmitting a transfer request, a game terminal serving as a management device corresponding to a communication group including the game terminal. This mode in which a game terminal concurrently serves as a management device includes a mode in which a predetermined one of the plural game terminals of each communication group may be caused to function as a management device corresponding to the communication group, and a mode in which an arbitrary one of the plural game terminals of each communication group may be caused to function as a management device corresponding to the communication group. In the latter case, each game terminal will identify, before transmitting a transfer request, a game terminal that is functioning as a management device corresponding to a communication group including the game terminal.

In a mode in which a game terminal concurrently serves as a management device, the game terminal concurrently serving as a management device would include a virtual entity provided with the functions of a game terminal and a virtual entity provided with the functions of a management device. A process can be shown as an example of a virtual entity. In a case in which the virtual entity is a process, the communication between a management device and a game terminal concurrently functioning as a management device will be "InterProcess Communication".

In the first mode, each of the game terminals (10, 10, . . . ) of the plural communication groups (5A, 5B, 5C, . . . ) may further have a return notification transmitter (11, 17) that transmits a return notification notifying a return of the entitlement to a management device (50) corresponding to a communication group including the game terminal (10) in a case in which the entitlement is not necessary, and each of the plural management devices (50) may have: a return notification receiver (51, 52) that receives the return notification; and a return processor (51) that, upon the return notification receiver (51, 52) receiving the return notification, updates the memory content of the entitlement storage (54) so that the number of the entitlements held by the management device (50) is increased by 1. According to this mode (hereinafter referred to as a "second mode"), the entitlement is returned to a management device from a game terminal that has been selected as a parent node in a case in which the entitlement is no longer required. Therefore, the chances of exercising the entitlement can be repeatedly provided for the game terminals included in a communication group corresponding to the management device. Because the entitlement is not necessary during a period other than a period in which the entitlement is being exercised, it is preferable for the return notification transmitter to transmit a return notification immediately after a period in which the entitlement has been exercised.

In the second mode, the selector (41), upon receiving a grouping request containing the ability data, may determine whether one game terminal (10) has already been selected as a parent node and transmit, in a case in which the parent node has already been selected, a "not-needed" notification indicating that the ability data is not needed to a game terminal (10) that has transmitted the grouping request, and each of the plural game terminals (10, 10, . . . ) of the plural communication groups (5A, 5B, 5C, . . . ) may have a "not-needed" notification receiver (11, 17) that receives the "not-needed" notification, and the return notification transmitter (11, 17), upon the "not-needed" notification receiver (11, 17) receiving the "not-needed" notification, that transmits a return notification for notifying the return of the entitlement to a management device (50) corresponding to a communication group containing the game terminal (10). According to this embodiment, because the entitlement that is not necessary is immediately returned, it is unlikely that one or more game terminals will miss an opportunity to exercise the entitlement, one or more game terminals being included in the same communication group as the game terminal that has returned the entitlement.

Additionally, in the above game system (100), the server device may form the player group sequentially one by one and select a predetermined number of the game terminals as the child nodes, and the selector (41) may have a main selector (41), upon receiving the grouping request containing the ability data, that selects the game terminal (10) that has transmitted the grouping request as a parent node of a player group that is to be formed at an earliest timing from among ungrouped player groups in a case in which no game terminal (10) has been selected as a parent node of the earliest-to-be-formed player group, and that selects, in a case in which a game terminal has been selected as a parent node of the earliest-to-be-formed player group, the transmitter game terminal (10) as a parent node of a player group that is to be formed at an earliest timing from among player groups for each of which no game terminal (10) as a parent has been selected, whereas in a case in which the grouping request does not contain the ability data, that selects the transmitter game terminal (10) as a child node of a player group to be formed at an earliest timing from among ungrouped player groups if a selection number of the earliest-to-be-formed player group is smaller than the predetermined number, with the selection number indicating a number of game terminals (10) already selected as child nodes of a player group and that selects, in a case in which the selection number is not smaller than the predetermined number, the transmitter game terminal (10) as a child node of a player group that is to be formed at an earliest timing from among player groups for which the selection number is smaller than the predetermined number; and a secondary selector (41) that, when a predetermined time has elapsed since a grouping request was received for the first time from a game terminal (10) that has been selected as a parent node or a child node of a player group to be formed at an earliest timing from among ungrouped player groups, with the grouping request having caused the selection, in a case in which the selection number of the earliest-to-be-formed player group is smaller than the predetermined number and in which a number of game terminals (10) that have been selected as a parent node of another player group to be formed after the earliest-to-be-formed player group is larger than a difference obtained by deducting the selection number from the predetermined number, selects, from among the game terminals (10) that have been selected as a parent node of another player group to be formed after the earliest-to-be-formed player group, a game terminal (10) of the number corresponding to the difference as child nodes of the earliest-to-be-formed player group from among ungrouped player groups. According to this embodiment, the probability can be reduced that a player group will not be formed even after a predetermined time has elapsed since a game terminal sent a grouping request, the player group including the game terminal.

In another aspect, the present invention provides a game terminal (10) for use in a game system (100) including a server device (40), the game terminal having: a communicator (17) that communicates with the server device (40) that forms a player group of game terminals that will play a multiple-player game in a unit of a group by selecting, from among plural game terminals (10, 10, . . . ) of plural communication groups (5A, 5B, 5C, . . . ), one game terminal (10) as a parent node requiring a larger amount of bandwidth during a game and at least two game terminals as child nodes each requiring a smaller amount of bandwidth; an inputter (14) that receives an instruction input by a player; a grouping request transmitter (11, 17) that generates, upon a predetermined instruction being input via the inputter (14), a grouping request for requesting the forming of the player group and that transmits the grouping request to the server device (40) via the communicator (17); a player group data receiver (11, 17) that receives, via the communicator (17), player group data indicating the configuration of the player group; and a controller (11) that determines, on the basis of the player group data, whether the game terminal has been selected as a parent node, the controller controlling communication during the game based on a result of the determination; with the grouping request transmitter (11, 17) having: an entitlement determiner (11) that determines, upon receiving the predetermined instruction, whether the game terminal can exercise entitlement to function as a parent node; and a generator (11) that generates, in a case in which the entitlement determiner (11) has determined that the exercise of the entitlement is possible, the grouping request containing ability data indicating that the game terminal has an ability to be selected as a parent node and that otherwise generates the grouping request not containing the ability data, and the server device (40) may have: an ability detector (41, 42) that detects whether the grouping request contains the ability data upon receiving the grouping request; a selector (41) that selects, as a parent node, one of game terminals (10) from among game terminals that have transmitted the grouping request containing the ability data and that selects at least two game terminals as child nodes from among game terminals that have transmitted the grouping requests other than the one game terminal (10) selected as the parent node; and a player group data transmitter (41, 42) that transmits, to each of the game terminals configuring the player group grouped through the selection by the selector (41), the player group data of the player group; and each of the plural communication groups (5A, 5B, 5C, . . . ) has plural game terminals (10, 10, . . . ), the plural communication groups (5A, 5B, 5C, . . . ) have been allocated different communication paths from one another, and the plural game terminals (10, 10, . . . ) of each of the communication groups share a communication path allocated to the communication group.

According to the game terminal, the above described game system can be configured. Therefore, according to this game terminal, the maximum required bandwidth can be minimized without decreasing the freedom in designing a game.

In still another aspect, the present invention provides a server device for use in a game system having plural communication groups (5A, 5B, 5C, . . . ) each including plural game terminals (10, 10, . . . ), in which the plural communication groups have been allocated different communication paths from one another, and the plural game terminals (10, 10, . . . ) of each of the communication groups share a communication path allocated to each communication group, the server device (40) having: a communicator (42) that communicates with each of the plural game terminals; and a grouper that forms a player group of game terminals that will play a multiple-player game in a unit of a group by selecting, from among the plural game terminals (10, 10, . . . ) of the plural communication groups (5A, 5B, 5C, . . . ), one game terminal (10) as a parent node requiring a larger amount of bandwidth during a game and at least two game terminals as child nodes each requiring a smaller amount of bandwidth, and each of the plural game terminals (10, 10, . . . ) of the plural communication groups (5A, 5B, 5C, . . . ) may have: an inputter (14) that receives an instruction input by a player; a grouping request transmitter (11, 17) that generates, upon a predetermined instruction being input via the inputter (14), a grouping request for requesting the forming of the player group and that transmits the grouping request to the server device (40); a player group data receiver (11, 17) that receives player group data indicating the configuration of the player group via the communicator; and a controller (11) that determines, on the basis of the player group data, whether the game terminal (10) has been selected as a parent node and that controls communication during the game based on a result of the determination, with the grouping request transmitter (11, 17) having: an entitlement determiner (11) that determines, upon receiving the predetermined instruction, whether the game terminal can exercise entitlement to function as a parent node; and a generator (11) that generates, in a case in which the entitlement determiner (11) has determined that the exercise is possible, the grouping request containing ability data indicating that the game terminal (10) has an ability to be selected as a parent node and that otherwise generates the grouping request not containing the ability data, and the grouper of the server device (40) may have: an ability detector (41, 42) that detects whether the grouping request contains the ability data upon receiving the grouping request via the communicator; a selector (41) that selects, as a parent node, one of game terminals (10) from among game terminals that have transmitted the grouping request containing the ability data and that selects at least two game terminals (10) as child nodes from among game terminals that have transmitted the grouping requests other than the one game terminal (10) selected as the parent node; and a player group data transmitter that transmits, to each of the game terminals configuring the player group grouped through the selection by the selector (41), the player group data of the player group.

According to this server device, the above-described game system can be configured. Therefore, according to this server device, the maximum required bandwidth can be minimized without degrading the freedom in designing a game.

Additionally, in the present embodiment, the presence or absence of the entitlement may be determined instead of determining whether the entitlement can be exercised. Specifically, in the above described game system, the entitlement determiner (11) may determine whether a game terminal has an entitlement when a predetermined instruction is input, and the generator (11) may generate, in a case in which it is determined by the entitlement determiner (11) that the game terminal has the entitlement, the grouping request including ability data indicating that the game terminal has the ability to be selected as a parent node, and otherwise generates the grouping request not containing the ability data. Furthermore, in a case in which the entitlement determiner (11) has the transfer requester (11) and the entitlement obtainer (11, 17), the transfer requester (11) may transmit to the management device corresponding to the communication group including the game terminal, a transfer request requesting the transfer of the entitlement so as to determine whether the game terminal has an entitlement and the entitlement obtainer (11, 17) may receive entitlement data indicating that the game terminal has an entitlement, and the entitlement determiner (11) may determine that the game terminal has the entitlement only in a case in which the entitlement obtainer receives the entitlement data.

EFFECTS OF THE INVENTION

According to the invention, the maximum required bandwidth can be minimized without reducing the degree of freedom in the game designing.

BRIEF DESCRIPTION OF DRAWINGS

FIG. 12B is a sequence diagram showing an operational example of game system 100.

FIG. 13 is a diagram showing an example of details of entry list 441.

FIG. 14 is a diagram showing an example of details of entry list 441.

FIG. 15 is a diagram showing an example of details of entry list 441.

FIG. 16 is a diagram showing an example of details of entry list 441.

BEST MODE FOR CARRYING OUT THE INVENTION

In the following, description will be given of a preferred embodiment of the present invention, with reference to the drawings. A specific configuration described in the following is merely an example, and the present invention encompasses, as its scope, various embodiments obtained by modifying the specific configuration.

Figure 1:
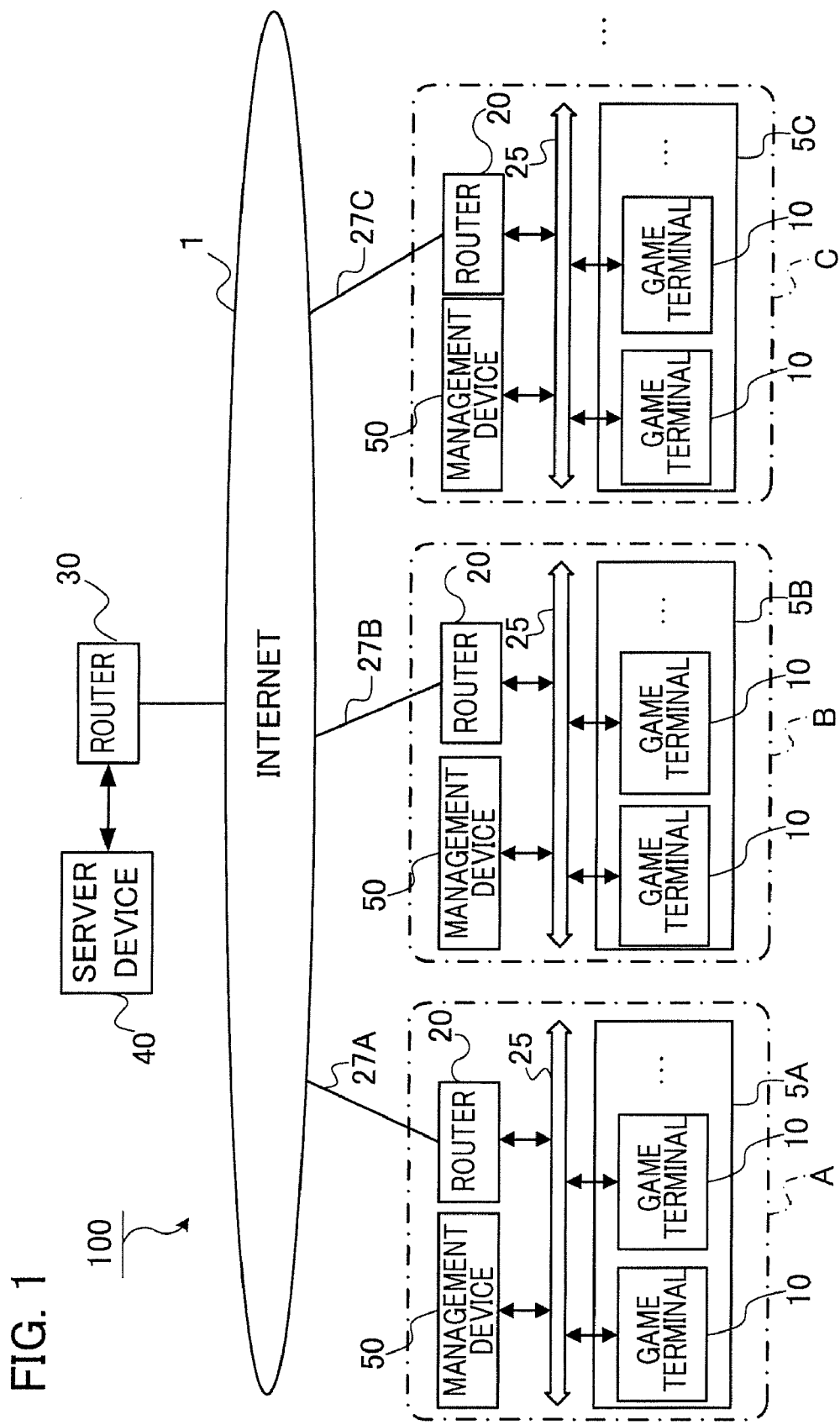
FIG. 1 is a block diagram showing an overall configuration of a game system 100 according to an embodiment of the present invention.

Game System:

FIG. 1 is a block diagram showing an overall configuration of game system 100 according to an embodiment of the present invention. Game system 100 is a system in which players are able to play a predetermined game in a unit of a group constituting three communication nodes. The predetermined game is a multiplayer-type network game, and the execution of the game essentially involves communication between communication nodes constituting a group (hereinafter referred to as a "player group") of game terminals who will be players playing the game.

A part of game system 100 is sited at a venue (facility) A, B, C, . . . where players who have visited the site can play the predetermined game. Specifically, each venue is provided with a LAN (Local Area Network) 25, four game terminals 10 connected to LAN 25, and so as to allow players to play the predetermined game, a router 20 connecting LAN 25 to an Internet 1, and a management device 50, also connected to LAN 25, for managing a parent node entitlement (a right) which will be described later. Furthermore, game system 100 is provided with a server device (matching server device) 40 that forms the player group by selecting three game terminals 10 as communication nodes and a router 30 connecting server device 40 and the Internet 1.

At each venue, four game terminals 10 constitute a communication group. For example, at the venue A, there is a communication group 5A including four game terminals in the venue A. The communication between the Internet 1 and each venue is performed via a communication path corresponding to the venue. The communication path corresponding to the venue is a communication path between router 20 of the venue and the Internet 1 and is allocated to a communication group in the venue. For example, a communication path 27A corresponding to the venue A is allocated to the communication group 5A. Game terminal 10 at each venue is capable of communicating with another device sited in the same venue via LAN 25 and is also capable of communicating with server device 40 and game terminals of another venue via LAN 25, router 20, the communication path corresponding to the venue, and the Internet 1.

Description will now be given of the "player group". From among three communication nodes included in a player group, one is a parent node, which requires a large bandwidth while playing the predetermined game, and the others are child nodes, which require a small bandwidth while playing the predetermined game. In actuality, server device 40 forms a player group by selecting one game terminal 10 as a parent node and two game terminals 10 as child nodes. Each game terminal 10 is capable of transmitting a grouping request for requesting the forming of a player group to server device 40. The three game terminals 10 are selected from game terminals 10 that have transmitted grouping requests.

The "parent node entitlement" will be described next. In the present embodiment, the number of game terminals 10 acting as a parent node is limited to one for each communication group, thereby solving the problem. The parent node entitlement is a concept introduced to realize the limit. The parent node entitlement is a right to function as a parent node and is exercised by one or more other game terminals 10. In the present embodiment, one parent node entitlement is allocated to each communication group 5A, 5B, 5C, . . . . A parent node entitlement allocated to each communication group is managed by management device 50 corresponding to each communication group.

Game terminal 10, having the parent node entitlement, is capable of transmitting a grouping request containing ability data indicating the ability to be selected as a parent node, and is also operative as a parent node in a case in which game terminal 10 is selected as a parent node by server device 40. As is obvious from the above, the parent node entitlement is a right to transmit a grouping request containing ability data indicating ability to be selected as a parent node and also is an entitlement to operate as a parent node. A game terminal 10 operating as a parent node is selected from game terminals 10 that have transmitted a grouping request containing ability data to server device 40.

Figure 2:
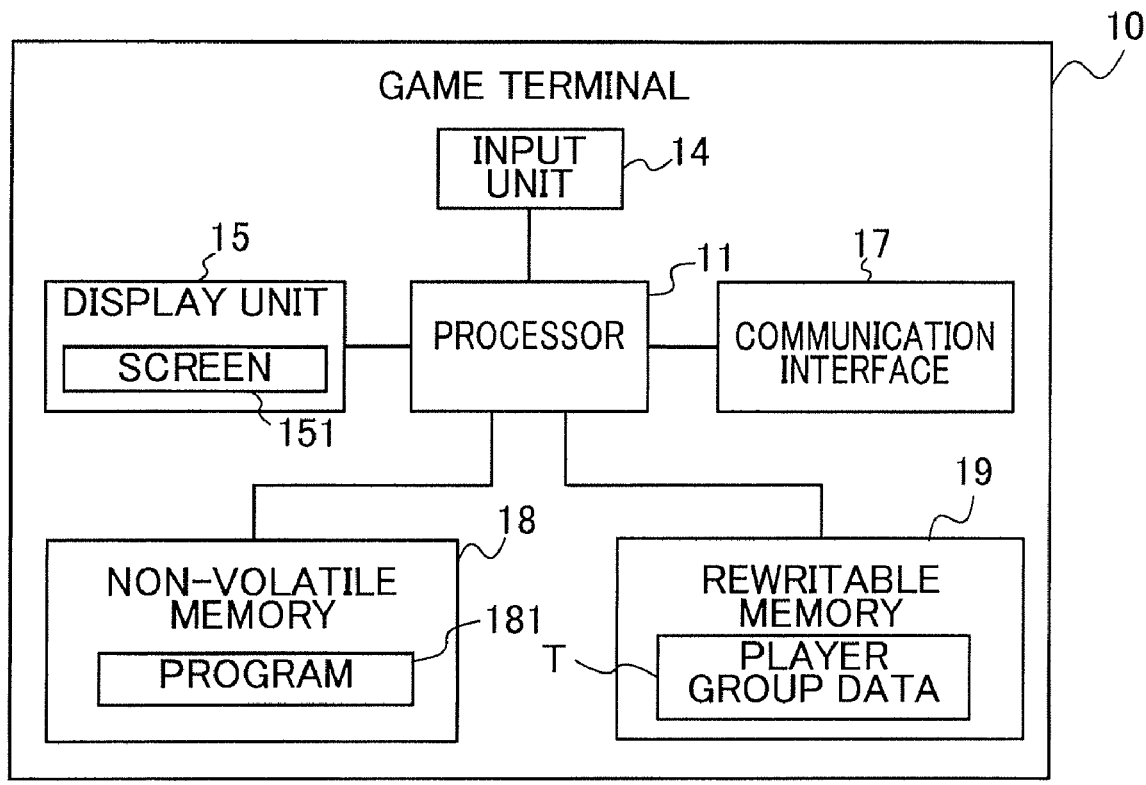
FIG. 2 is a block diagram showing a configuration of a game terminal 10 of game system 100.

Game Terminal:

FIG. 2 is a block diagram showing a configuration of game terminal 10. As shown in the figure, game terminal 10 has a processor 11, an input unit 14, a display unit 15, a communication interface (communication unit) 17, a non-volatile memory 18, and a rewritable memory 19. Processor 11 is, for example, at least one CPU (Central Processing Unit).

Input unit 14 is provided with plural operators, and when the operators are operated, supplies to processor 11 an operation signal corresponding to the operation. The plural operators include a start operator for inputting a start instruction (predetermined instruction) instructing the start of the predetermined game and other operators specific to the content of the predetermined game. For example, in a case in which the predetermined game is a game in which vehicles are manipulated in a virtual space, an operator for manipulating a vehicle is an operator specific to the content of the predetermined game.

Display unit 15 has a screen 151 and displays, when image data is supplied from processor 11, an image representing the image data on screen 151. A monitor or a video projector can be used as display unit 15. In a case in which a video projector is used, a screen on which an image is to be projected is screen 151. Communication interface 17 transmits and receives signals to and from LAN 25 and relays data from processor 11 and LAN 25 and vice versa. Processor 11 transmits and receives data to and from another device by using communication interface 17.

Non-volatile memory 18 is, for example, a ROM (Read Only Memory) or EEPROM (Electronically Erasable and Programmable ROM) and stores a program 181. Program 181, by being executed by processor 11, causes game terminal 10 to perform various processes such as a main process, which will be described later. Non-volatile memory 18 stores communication addresses of server device 40 and management device 50.

Rewritable memory 19 is, for example, a RAM (Random Access Memory) and stores player group data T showing a configuration of a player group to which this game terminal 10 belongs. The data configuration of player group data T is arbitrary, and for example, can be a configuration in which, for each of the three game terminals 10 constituting a player group, data showing a communication address of game terminal 10 is associated with a flag showing whether game terminal 10 has been selected as a parent node.

Figure 3:
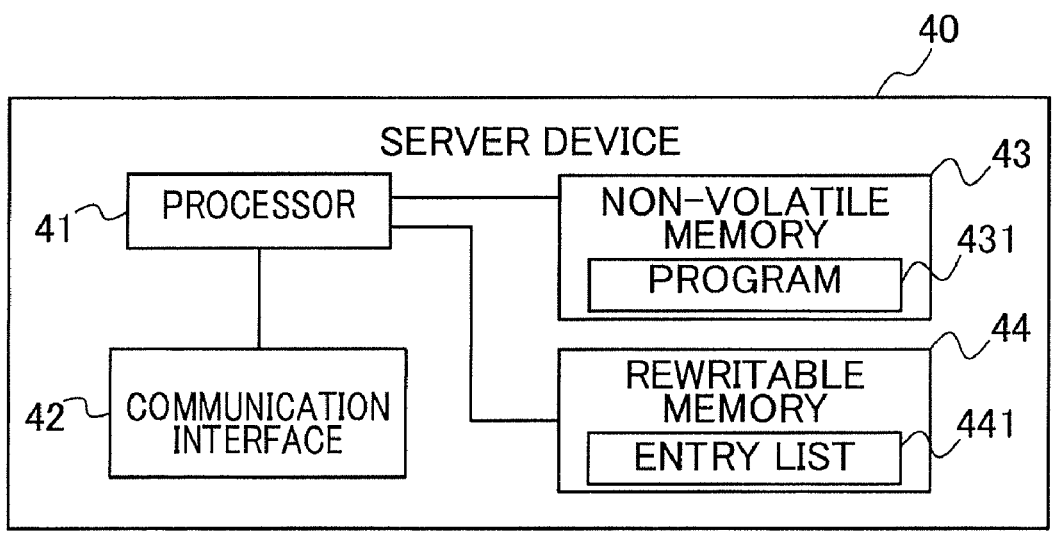
FIG. 3 is a block diagram showing a configuration of a server device 40 of game system 100.

Server Device:

FIG. 3 is a block diagram showing a configuration of server device 40. As show in the figure, server device 40 is provided with a processor 41, a communication interface (communication unit) 42, a non-volatile memory 43, and a rewritable memory 44. Processor 41 is, for example, at least one CPU. Communication interface 42 is for transmitting and receiving signals to and from router 30 and for relaying data from processor 41 to router 30 and vice versa. Processor 41 uses communication interface 42 to exchange data with another device.

Non-volatile memory 43 is, for example, a ROM or a hard disk, and it stores a program 431 therein. Program 431, being executed by processor 41, causes server device 40 to perform various processes such as a matching process and other processes, which will be described later. Rewritable memory 44 is, for example, a RAM and stores an entry list 441 therein, the entry list showing a configuration of a player group for which grouping has not yet been performed.

Figure 4:
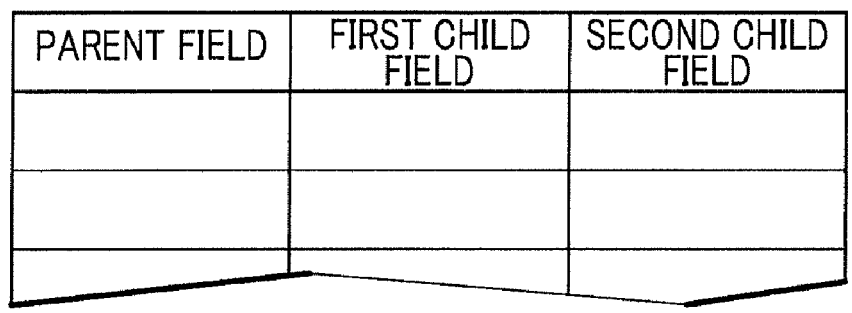
FIG. 4 is a schematic diagram showing a data configuration of an entry list 441 of the server device 40.

FIG. 4 is a schematic diagram showing a data configuration of entry list 441. As shown in the figure, entry list 441 is a sequence of a record having one parent field and two child fields (a first child field and a second child field). Each record corresponds to a player group, and the order of records corresponds to the order in which the grouping of a corresponding player group will be accomplished. Each record stores communication addresses of game terminals 10 constituting a corresponding player group. Specifically, a communication address of game terminal 10 selected as a parent node is stored in the parent filed, and a communication address of game terminal 10 selected as a child node is stored in each of the two child fields.

Figure 5:
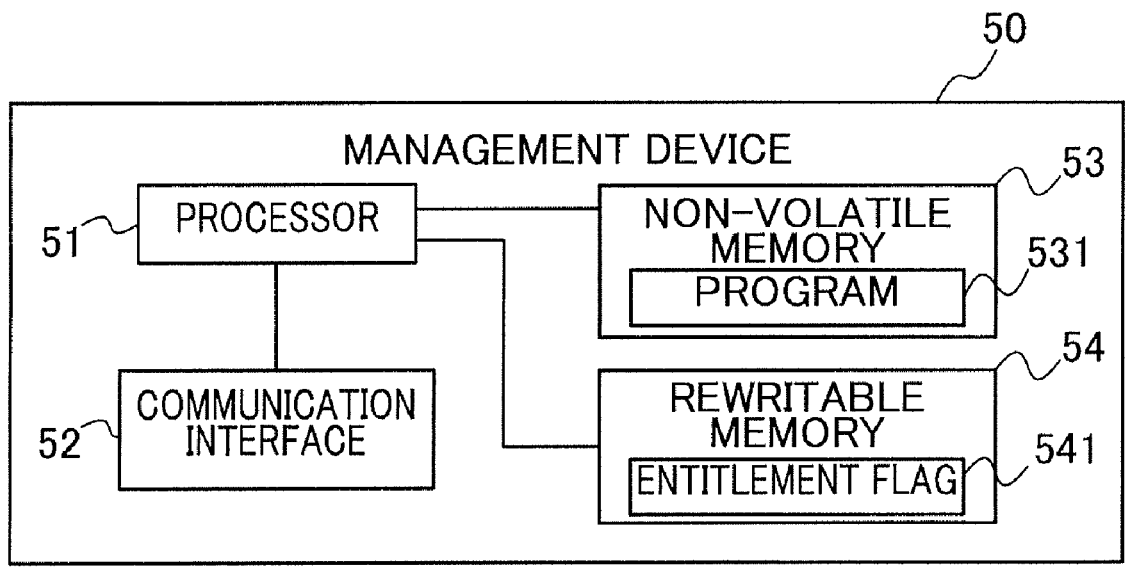
FIG. 5 is a block diagram showing a configuration of a management device 50 of game system 100.

Management Device:

FIG. 5 is a block diagram showing a configuration of management device 50. Management device 50 is provided with a processor 51, a communication interface 52, a non-volatile memory 53, and a rewritable memory 54. Processor 51 is, for example, at least one CPU. Communication interface 52 is for transmitting and receiving signals to and from LAN 25 and relays data from processor 51 to LAN 25 and vice versa. Processor 51 uses communication interface 52 to exchange data with another device.

Non-volatile memory 53 is, for example, a ROM and a hard disk, and it stores a program 531. Program 531, being executed by processor 51, causes management device 50 to perform various processes such as a management process and other processes, which will be described later. Rewritable memory 54 is, for example, a RAM, and stores an entitlement flag 541 showing the presence or absence of a parent node entitlement.

Because the number of parent node entitlements managed by management device 50 is one, and because entitlement flag 541 is a binary data, management device 50 having a parent node entitlement is equivalent to the number of parent node entitlements being one, and management device 50 not having a parent node entitlement is equivalent to the number of parent node entitlements being zero. That is, the entitlement flag 541 is data showing the number of parent node entitlements held by the management device 50.

Figure 6:
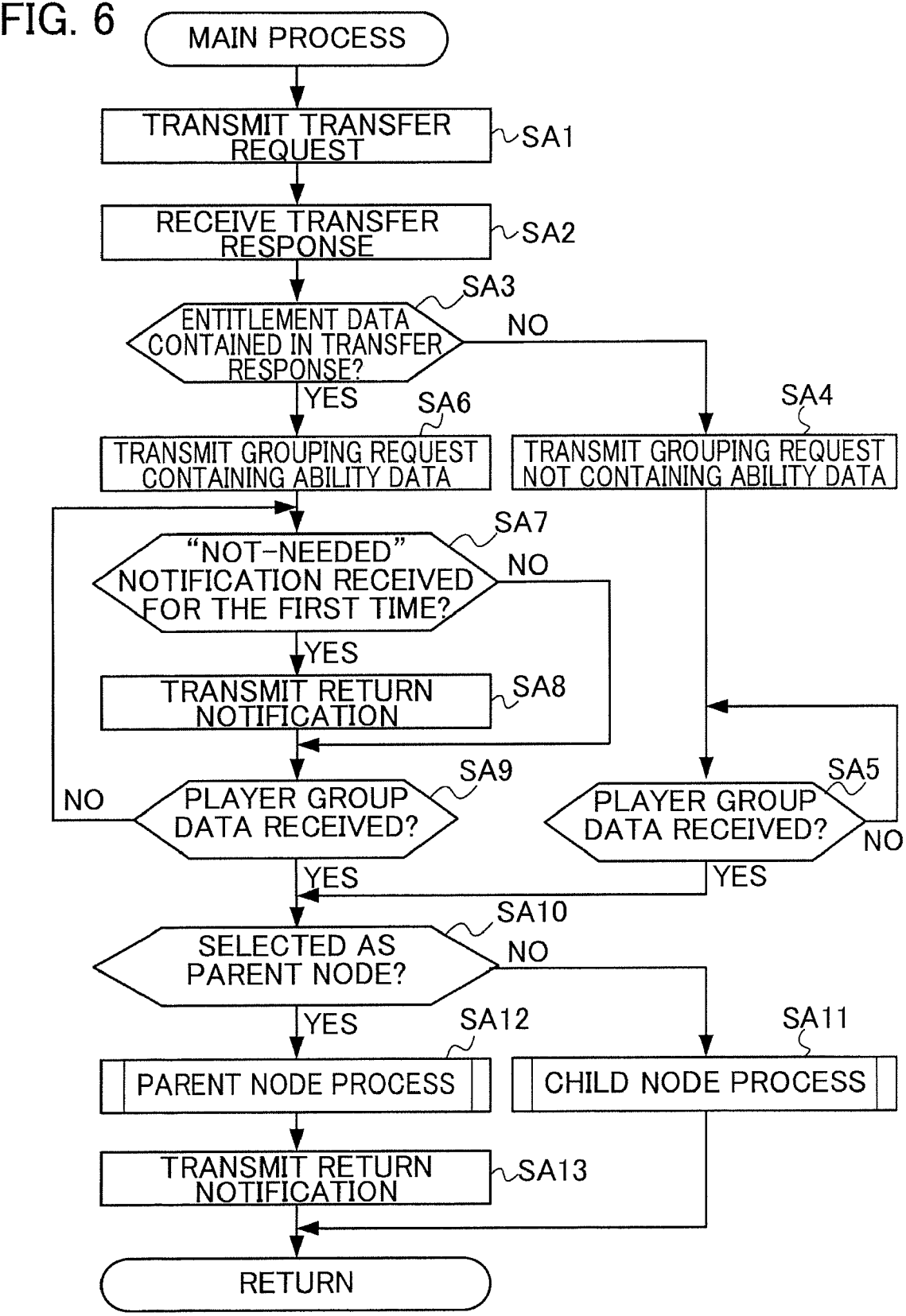
FIG. 6 is a flowchart showing a main process performed by a processor 11 of game terminal 10.

Main Process:

FIG. 6 is a flowchart of a main process performed by processor 11 of game terminal 10. Processor 11 executes the main process when an operation signal is supplied thereto from input unit 14, the operation signal corresponding to an operation made to a start operator. In the main process, processor 11 transmits, to management device 50 (hereinafter referred to as a "responsible management device") corresponding to a communication group (one of 5A, 5B, and 5C) that includes game terminal 10 of the processor 11, a transfer request requesting the transfer of a parent node entitlement (SA1).

Processor 11 subsequently receives, from the responsible management device, a transfer response that is a response to the transfer request (SA2). Processor 11 then determines whether the transfer response contains entitlement data indicates that game terminal 10 has the parent node entitlement (SA3). In a case in which a result of the determination is NO, processor 11 generates a grouping request not containing ability data, for transmission to server device 40 (SA4). Processor 11 then determines whether it has received player group data indicating a configuration of a player group (SA5). This determination is repeated until the determination changes to YES, i.e., until player group data is received.

Figure 10:
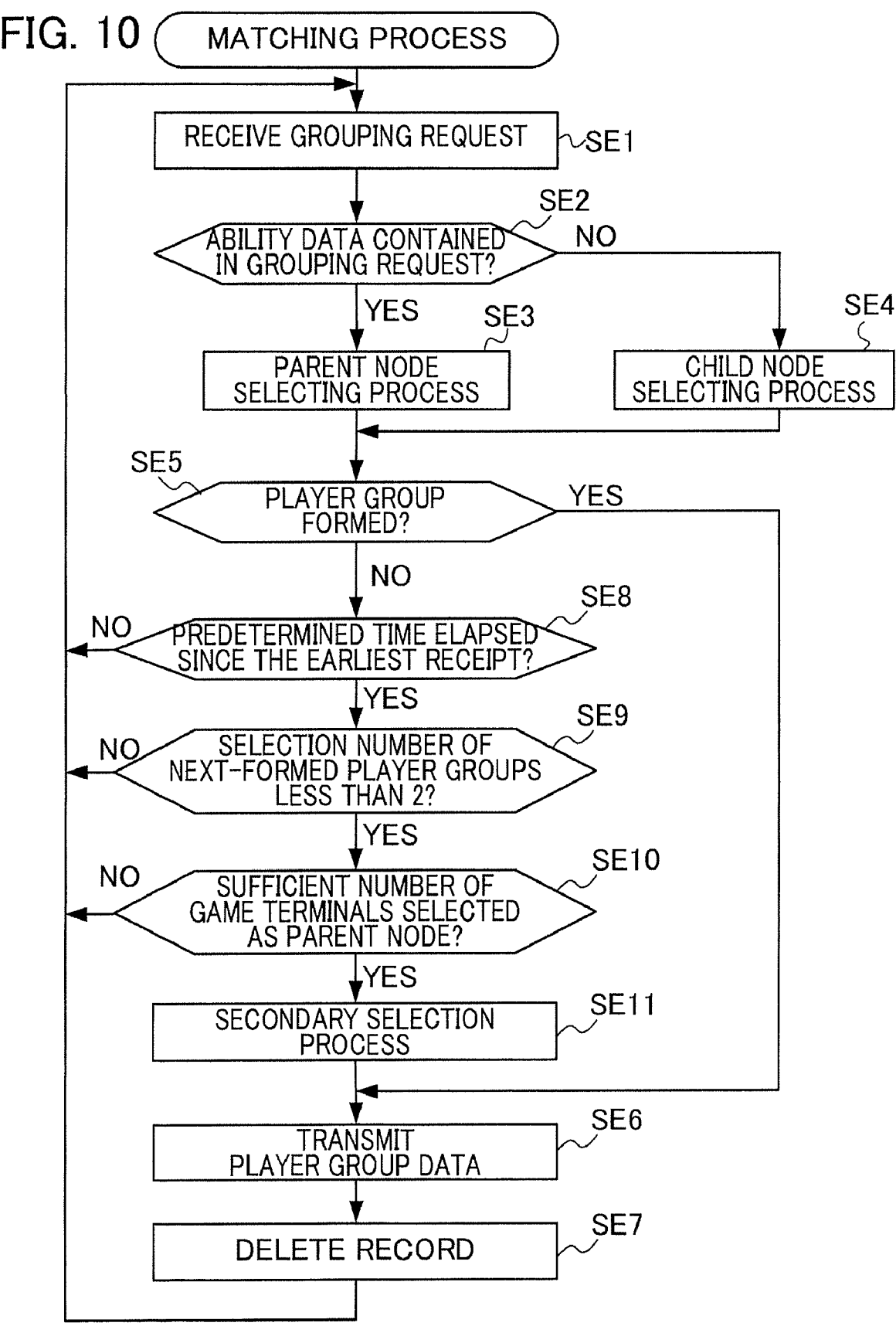
FIG. 10 is a flowchart showing a matching process performed by a processor 41 of server device 40.
Figure 11:
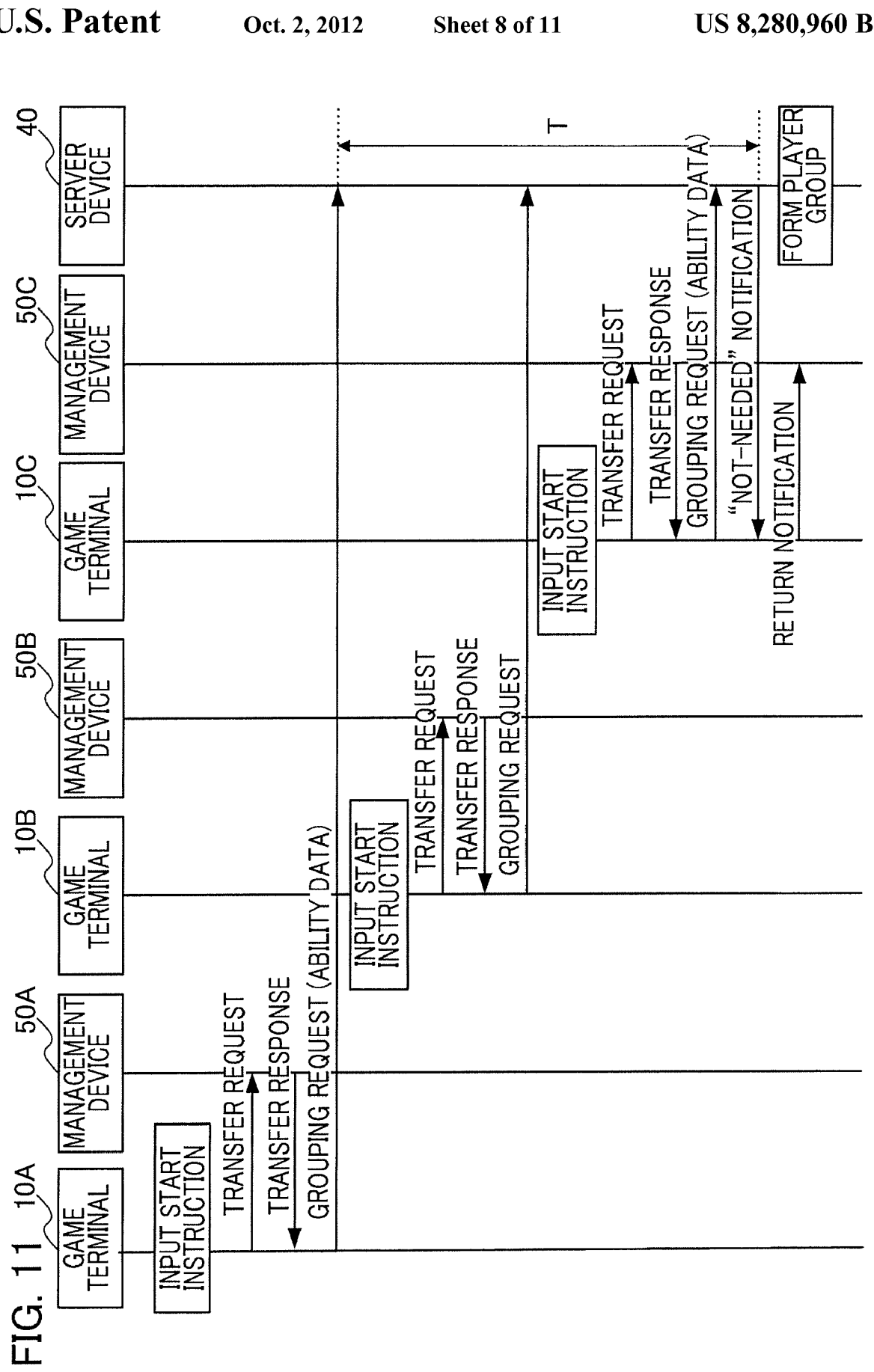
FIG. 11 is a sequence diagram showing an operational example of game system 100.

In a case in which a result of the determination of Step SA3 is YES, processor 11 generates a grouping request containing ability data for transmission to server device 40 (SA6). Processor 11 then determines whether a "not-needed" notification is received for the first time during a period after the grouping request was transmitted, the "not-needed" notification indicating that the ability data is unnecessary. Processor 11 transmits, to the responsible management device, a return notification notifying the return of the parent node entitlement only in a case in which a result of the determination is YES (SA8). Processor 11 then determines whether it has received a player group data (SA9) and proceeds the routine to Step SA7 in a case in which a result of this determination is NO. That is, processor 11 that have transmitted the grouping request containing the ability data repeats the processes from Steps SA7 through SA9 until it receives a player group data. The "not-needed" notification is transmitted from server device 40 to game terminal 10 in a case in which server device 40 has decided to have game terminal 10 function as a child node, even in a case in which game terminal 10 has requested that server device 40 instruct game terminal 10 to operate as a parent node by transmitting the grouping request containing ability data. A specific operational example thereof will be described below (FIGS. 10 and 11).

Processor 11, upon receiving player group data, stores the data as player group data T in rewritable memory 19. Processor 11 determines, based on player group data T, whether game terminal 10 of the processor 11 has been selected as a parent node (SA10). In a case in which a result of the determination is NO, processor 11 performs a child node process in which game terminal 10 is caused to operate as a child node (SA11), to terminate the main process. In a case in which a result of the determination of Step SA10 is YES, processor 11 performs a parent node process in which game terminal 10 is caused to operate as a parent node (SA12). When the parent node process ends and the predetermined game is finished, processor 11 transmits, to the responsible management device, a return notification notifying the return of the parent node entitlement (SA13), to end the main process.

Figure 7:
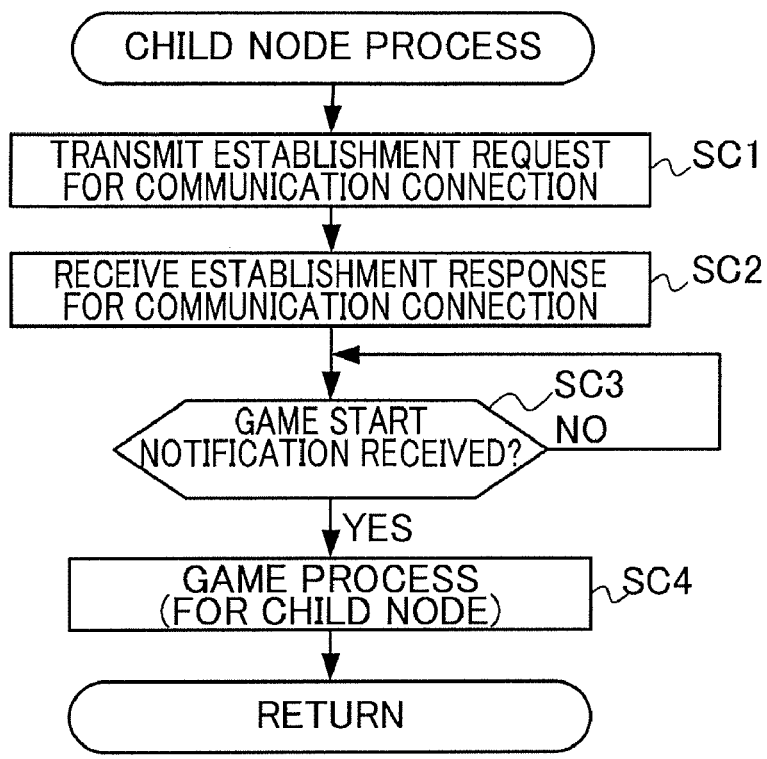
FIG. 7 is a flowchart showing a child node process performed by processor 11.

Child Node Process:

FIG. 7 is a flowchart showing a child node process performed by processor 11 of game terminal 10. In the child node process, processor 11 first determines a configuration of the player group to which game terminal 10 belongs, based on player group data, and performs a process of establishing communication connection with game terminal 10 that has been selected as a parent node. In this process, processor 11 transmits, to game terminal 10 selected as a parent node, an establishment request requesting the establishment of a communication connection (SC1) and receives from game terminal 10 an establishment response, which is a response to the establishment request (SC2).

Subsequently, processor 11 determines whether it has received a game start notification instructing the start of a game process, which will be described later (SC3). This determination is repeated until a result of the determination changes to YES, i.e., until processor 11 receives a game start notification. When a result of the determination of Step SC3 changes to YES, processor 11 performs a game process of advancing the predetermined game (SC4), to end the child node process.

In the game process, processor 11 generates an image based on operation signals supplied from input unit 14 and data from another game terminal 10 of a player group to which game terminal 10 of processor 11 belongs, so as to display the image on screen 151 of display unit 15.

Figure 8:
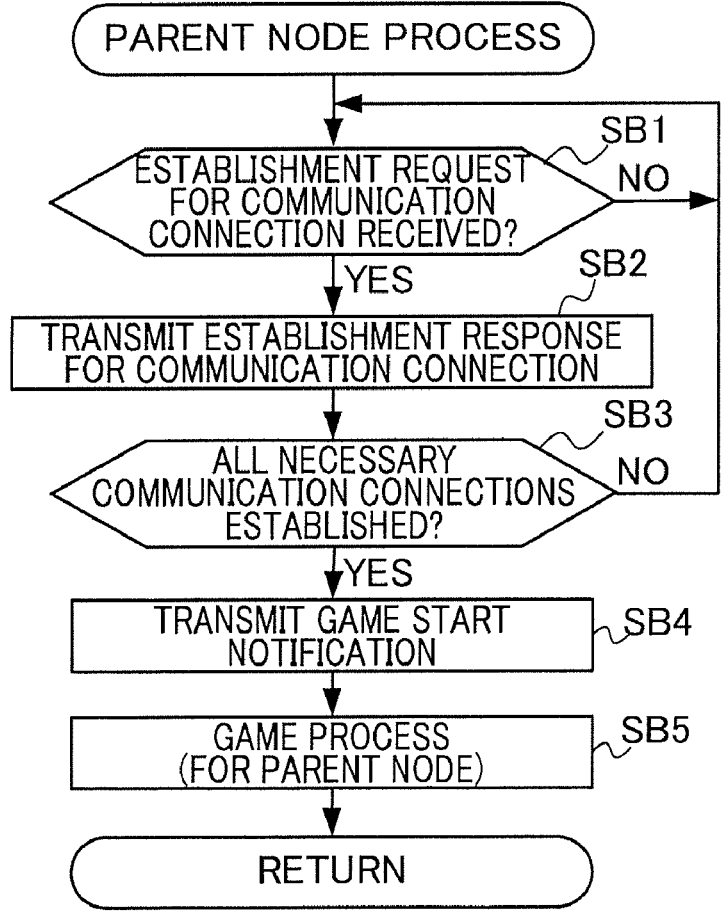
FIG. 8 is a flowchart showing a parent node process performed by processor 11.

Parent Node Process:

FIG. 8 is a flowchart of a parent node process performed by processor 11 of game terminal 10. In the parent node process, processor 11 first determines a configuration of the player group to which this game terminal 10 belongs and performs a process of establishing a communication connection with each of the two game terminals 10 that have been selected as child nodes. In this process, processor 11 first determines whether it has received an establishment request from game terminal 10 selected as a child node (SB1). The determination is repeated until a result of the determination changes to YES, i.e., until processor 11 receives an establishment request. When a result of the determination of Step SB1 changes to YES, processor 11 transmits an establishment response to game terminal 10 that has transmitted the establishment request (SB2). Processor 11 then determines whether all the necessary communication connections are established (SB3). In a case in which a result of the determination is NO, processor 11 advances the routine to Step SB1.

In a case in which a result of the determination of Step SB3 changes to YES, processor 11 transmits a game start notification to each of the two game terminals 10 that have been selected as child nodes (SB4). Processor 11 then performs a game process (SB5), to end the parent node process. The game process of Step SB5 is a game process for a parent node. That is, in the game process, other game terminals 10, which will be at the other end of the communication connection, will be the two game terminals 10 that have been selected as child nodes, and therefore, the number of communication connections used in the communication will be two.

Figure 9:
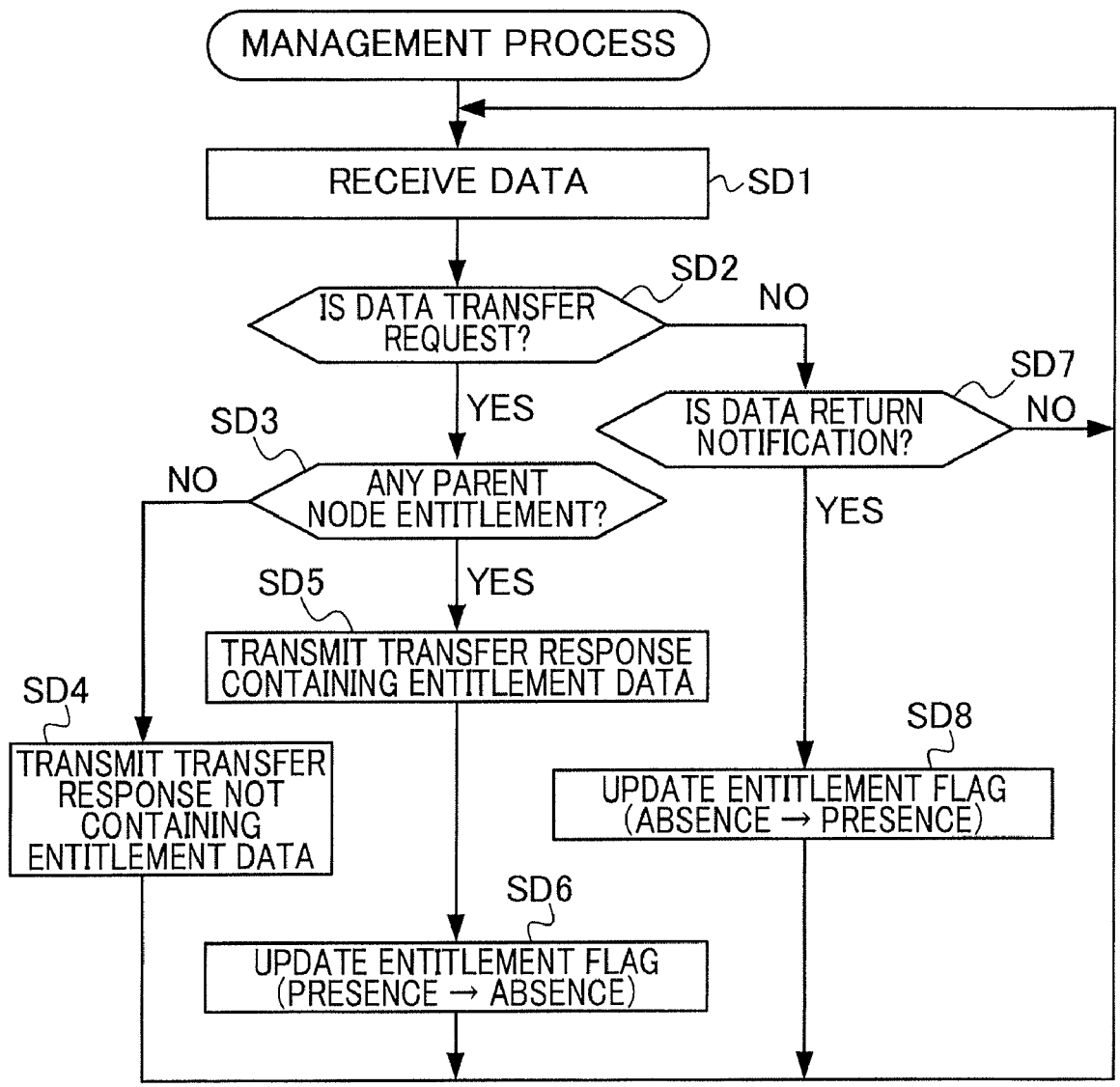
FIG. 9 is a flowchart showing a management process performed by a processor 51 of management device 50.

Management Process:

FIG. 9 is a flowchart showing a management process performed by processor 51 of management device 50. In the management process, processor 51 first receives data from game terminal 10 included in a counterpart communication group (SD1). Processor 51 then determines whether the received data is a transfer request for requesting the transfer of a parent node entitlement (SD2). In a case in which a result of the determination is YES, processor 51 refers to entitlement flag 541 and determines whether there is a parent node entitlement (SD3). In a case in which a result of this determination is NO, processor 51 transmits, to game terminal 10 that has transmitted the transfer request, a transfer response not containing entitlement data indicating that game terminal 10 has a parent node entitlement (SD4) and advances the routine to Step SD1.

In a case in which a result of the determination of Step SD3 is YES, processor 51 transmits to the game terminal 10 that has transmitted the transfer request a transfer response containing the entitlement data (SD5). Processor 51 then updates entitlement flag 541 so that it indicates that there is no parent node entitlement (SD6) and advances the process to Step SD1.

On the other hand, in a case in which a result of the determination of Step SD2 is NO, processor 51 determines whether the received data is a return notification notifying the returning of the parent node entitlement to management device 50 (SD7). In a case in which a result of the determination changes to NO, processor 51 advances the process to Step SD1. In a case in which a result of the determination of Step SD7 is YES, processor 51 updates entitlement flag 541 so that it indicates that there is a parent node entitlement (SD8) and advances the process to Step SD1.

Matching Process:

FIG. 10 is a flowchart of a matching process performed by processor 41 of server device 40. In the matching process, processor 41 first receives a grouping request from game terminal 10 included in game system 100 (SE1). Processor 41 then determines whether the received grouping request contains ability data (SE2). Processor 41 subsequently performs a main selection process. Specifically, processor 41 performs a parent selection process in a case in which a result of the determination of Step SE2 is YES (SE3), whereas processor 41 performs a child selection process in a case in which a result of the determination is NO (SE4).

In the parent selection process, processor 41 selects a game terminal 10 that has transmitted the received grouping request as a parent node. Specifically, processor 41 stores a communication address of game terminal 10 that has transmitted the received grouping request in the parent field of a record corresponding to a player group that is to be formed at the earliest timing, from among records with blank parent fields (a record with no communication address having been stored in its parent field). In a case in which there is no record with a blank parent field, a blank record is added to entry list 441, after which the above process is performed.

In the child selection process, processor 41 selects a game terminal 10 that has transmitted the received grouping request as a child node. Specifically, processor 41 stores a communication address of game terminal 10 that has transmitted the received grouping request in a blank child field of a record corresponding to a player group that is to be formed at the earliest timing, from among records with either one or both of the two child fields being blank. In a case in which there is no record with either one or both of the two child fields being blank, a blank record is added to entry list 441, after which the above process is performed.

Processor 41 subsequently determines whether a player group is formed (SE5). Specifically, processor 41 determines whether three game terminals 10 have been selected for a player group that is to be formed at the earliest timing (hereinafter referred to as a "next-formed player group") from among player groups with their corresponding records existing in entry list 441. More specifically, it is checked whether a communication address is stored in all of the fields of a record corresponding the next-formed player group (hereinafter referred to as a "next-formed record") from among records of the entry list 441.

In a case in which a result of the determination of Step SE5 is YES, processor 41 refers to the next-formed record to generate player group data for transmission to game terminals 10 that have communication addresses stored in the fields of the next-formed record (SE6). Subsequently, processor 41 deletes the record from entry list 441 (SE7), to advance the process to Step SE1.

On the other hand, in a case in which a result of the determination of Step SE5 is NO, processor 41 determines whether a predetermined time (T) has passed since the first receipt (SE8). In a case in which a result of the determination is NO, processor 41 advances the process to Step SE1. The first receipt is the earliest (the oldest) receipt from among the receipts of grouping requests that have caused communication addresses that have been stored in entry list 441 to be stored in entry list 441.

In a case in which a result of the determination of Step SE8 is YES, processor 41 determines whether the number of game terminals 10 that have been selected as child nodes (the selection number) in the next-formed player group is less than 2 (SE9) and advances the process to Step SE1 in a case in which a result of the determination changes to NO. In the present embodiment, the selection number is 0, 1, or 2.

In a case in which a result of the determination of Step SE9 is YES, processor 41 determines whether the number of game terminals 10 that have been selected as parent nodes (hereinafter referred to as a "provisional parent number") of a player group to be formed subsequent to the next-formed player group (hereinafter referred to as a "subsequent player group") is sufficient (SE10). A result of the determination changes to NO in a case in which the provisional parent number is less than a difference obtained by deducting the selection number of the next-formed player group from 2, and it changes to YES if the provisional parent number is equal to or larger than the difference. In a case in which a result of the determination changes to NO, processor 41 advances the process to Step SE1.

In a case in which a result of the determination of Step SE10 is YES, processor 41 performs a secondary selection process in which the next-formed player group is formed by allocating one or more parent nodes of one or more subsequent player groups for one or more child nodes of the next-formed player group (SE11). Specifically, from among one or more game terminals 10 that have been selected as one or more parent nodes of subsequent player groups, the one or more game terminals 10 of the number corresponding to the above difference are selected as the one or more child nodes of the next-formed player group. More specifically, processor 41 focuses on one or more records of the number corresponding to the above difference, from among the records in entry list 441, with the one or more records that are focused on following the next-formed record, and processor 41 transfers one or more communication addresses stored in the one or more parent fields of the one or more records to the one or more blank child fields of the next-formed record. Processor 41 also transmits a "not-needed" notification to the one or more game terminals 10 corresponding to the one or more transferred communication addresses. It is noted that, in a case in which the transfer of the one or more communication addresses causes a blank record, processor 41 deletes the record from entry list 441. When the secondary selection process is finished, processor 41 performs the processes of Steps SE6 and SE7 and advances the process to Step SE1.

Operational Example:

Description will be next given of an operational example of game system 100. In this operational example, game terminal 10 of the venue A (hereinafter referred to as "game terminal 10A") communicates with management device 50 of the venue A (hereinafter referred to as "management device 50A") to transmit a grouping request containing ability data, game terminal 10 of the venue B (hereinafter referred to as "game terminal 10B") communicates with management device 50 of the venue B (hereinafter referred to as "management device 50B") to transmit a grouping request not containing ability data showing ability to be selected as a parent node, and game terminal 10 of the venue C (hereinafter referred to as "game terminal 10C") communicates with management device 50 of the venue C (hereinafter referred to as "management device 50C") to transmit a grouping request containing ability data. As a result, a player group is formed of game terminals 110A, 10B, and 10C, and the predetermined game advances in the player group. Specific description will be given below. It is assumed here that the entry list 441 is in a state in which no record is included.

FIG. 11 is a sequence diagram showing an operational example of game system 100. As shown in the figure, a start instruction is first input with input unit 14 at game terminal 10A. Processor 11 of game terminal 110A then transmits to management device 50A a transfer request requesting the transfer of a parent node entitlement. It is assumed here that entitlement flag 541 is stored in rewritable memory 54 of management device 50A, and that the entitlement flag indicates that there is a parent node entitlement. Therefore, processor 51 of management device 50A that has received the transfer request transmits to game terminal 10A a transfer response containing entitlement data indicating that game terminal 10A has a parent node entitlement and updates entitlement flag 541 so that it indicates that there is no parent node entitlement. The parent node entitlement of management device 50A is thus transferred to game terminal 10A.

Processor 11 of game terminal 10A, having received the transfer response, transmits a grouping request containing ability data to server device 40. Processor 41 of server device 40, having received the grouping request, adds a blank record corresponding to the next-formed player group in entry list 441 as a next-formed record, and selects game terminal 10A as a parent node. As a result, the contents of the entry list 441 will be as shown in FIG. 13.

Subsequently, a start instruction is input with input unit 14 at game terminal 10B. Processor 11 of game terminal 10B then transmits to management device 50B a transfer request. It is assumed here that entitlement flag 541 is stored in rewritable memory 54 of management device 50B, and that the entitlement flag indicates that there is no parent node entitlement. Therefore, processor 51 of management device 50B, having received the transfer request, transmits to game terminal 10B a transfer response not containing entitlement data.

Processor 11 of game terminal 10B, having received the transfer response, transmits a grouping request not containing ability data to server device 40. Processor 41 of server device 40, having received the grouping request, selects game terminal 10B as a child node. As a result, the contents of the entry list 441 will be as shown in FIG. 14.

Subsequently, a start instruction is input with input unit 14 at game terminal 10C. Processor 11 of game terminal 10C then transmits to management device 50C a transfer request requesting the transfer of a parent node entitlement. It is assumed here that entitlement flag 541 is stored in rewritable memory 54 of management device 50C, and that the entitlement flag indicates that there is a parent node entitlement. Therefore, processor 51 of management device 50C, having received the transfer request, transmits to game terminal 10C a transfer response containing entitlement data, and updates entitlement flag 541 so that it indicates that there is no parent node entitlement. The parent node entitlement of management device 50C is thus transferred to game terminal 10C.

Processor 11 of game terminal 10C, having received the transfer response, transmits a grouping request containing ability data to server device 40. Processor 41 of server device 40, having received the grouping request, adds a blank record corresponding to a player group to be formed after the next-formed player group in entry list 441 as a next-formed record and selects game terminal 10C as a parent node. As a result, the contents of the entry list 441 will be as shown in FIG. 15.

Furthermore, it is assumed that a predetermined time (T) has elapsed since the receipt of the grouping request from game terminal 10A. Processor 41 of server device 40 then performs the secondary selection process. That is, processor 41 allocates the parent node (game terminal 10C) of the subsequent player group as a child node of the next-formed player group, transmits a "not-needed" notification to game terminal 10C having a communication address that has been moved in the entry list in this allocation, and deletes, from entry list 441, a record that has turned blank as a result of the allocation. As a result, the contents of the entry list 441 will be as shown in FIG. 16.

Processor 11 of game terminal 10C, having received the "not needed" notification, transmits a return notification to management device 50C. Processor 51 of management device 50C, having received the return notification, updates the entitlement flag 541 so that it indicates that there is a parent node entitlement. The parent node transferred to game terminal 10C is thus returned to management device 50C.

Figure 12A:
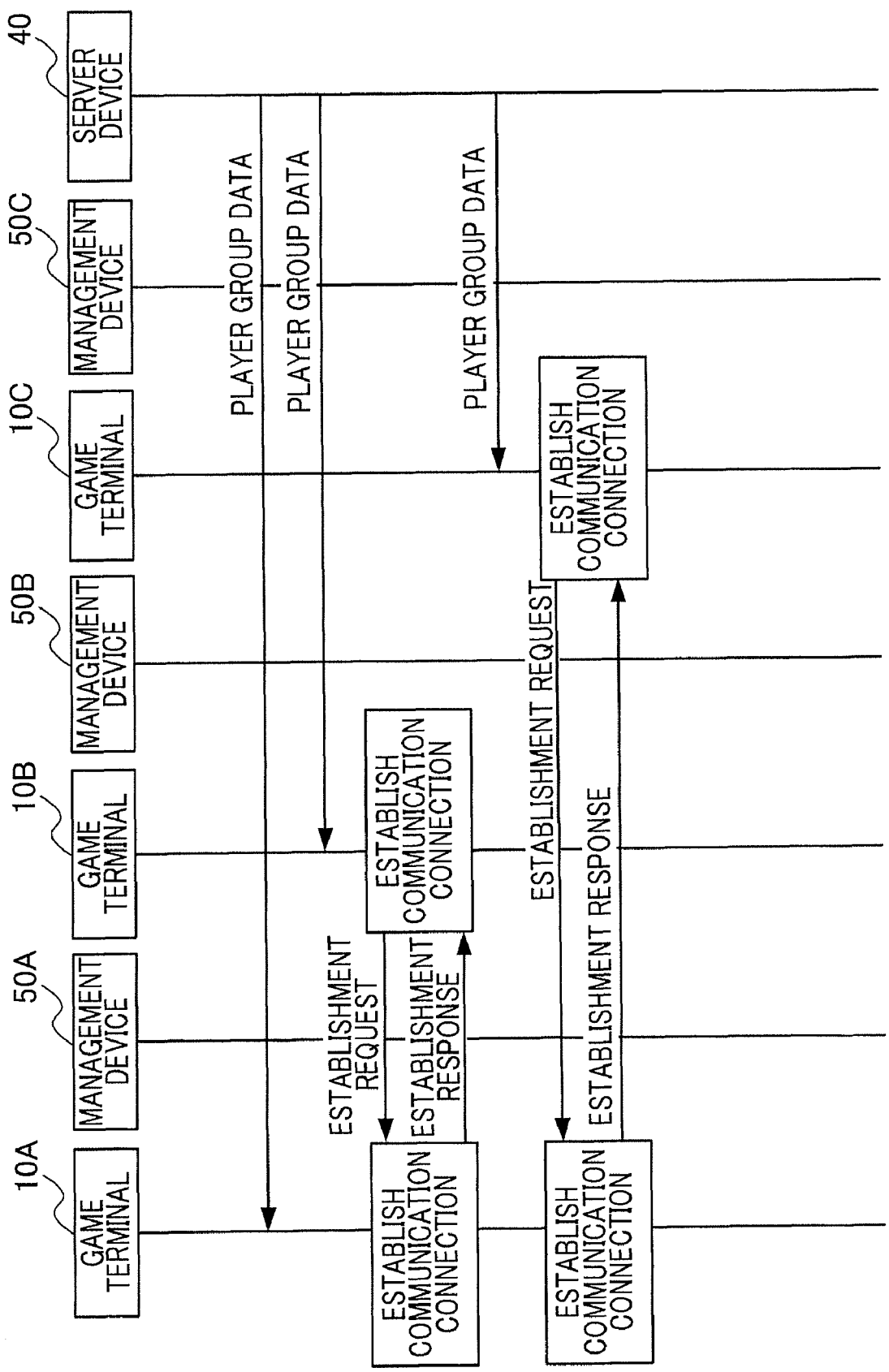
FIG. 12A is a sequence diagram showing an operational example of game system 100.

On the other hand, as shown in FIG. 12A, at server device 40, once a player group is formed of game terminals 10A, 10B, and 10C, processor 41 refers to a record of entry list 441 corresponding to the player group to generate player group data indicating the configuration of the player group, transmits the player group data to game terminals 10A, 10B, and 10C, and deletes the record from entry list 441. As a result, entry list 441 returns to a state of having no record.

Each processor 11 of game terminals 10A, 10B, and 10C, having received the player group data, stores the received player group data in rewritable memory 19. Processor 11 of game terminal 10A then determines, based on player group data T, that game terminal 10A has been selected as a parent node, and each processor of game terminals 10B and 10C determines, based on each player group data T, that game terminal 10 of processor 11 is selected as a child node.

Based on these determinations, processors 11 of game terminal 10A, 10B, and 10C establish a communication connection between game terminal 10A and game terminal 10B (hereinafter referred to as a "first connection") and a communication connection between game terminal 10A and game terminal 10C (hereinafter referred to as a "second connection"). The first connection is established by processor 11 of game terminal 10B transmitting an establishment request to game terminal 10A and by processor 11 of game terminal 10A transmitting an establishment response to game terminal 10B as a response. The second connection is established by processor 11 of game terminal 10C transmitting an establishment request to game terminal 10A and by processor 11 of game terminal 10A transmitting an establishment response to game terminal 10C as a response.

As shown in FIG. 12B, processor 11 of game terminal 10A transmits a game start notification to each of game terminals 10B and 10C to start a game process for parent node. On the other hand, each processor 11 of game terminals 10B and 10C, having received the game start notification, starts a game process for child node. Each processor 11 of game devices 10A, 10B, and 10C performs a game process, thereby allowing three players, each using game terminals 10, to play the same predetermined game.

The communication using the first connection and the communication using the second connection are performed in parallel during the game so that the game can be advanced. Given that one end of the first connection and one end of the second connection are both at game terminal 10A, the amount of bandwidth used for advancing the game, out of the total bandwidth of communication path 27A corresponding to communication group 5A including game terminal 10A will be twice as much as the amount of the bandwidth used for advancing the game of the total bandwidth of a communication path corresponding to a communication group including each game terminal 10 that has been selected as a child node.

When the predetermined game is finished, each processor 11 of game terminals 10A, 10B, and 10C terminates the game process. Processor 11 of game terminal 10A, having terminated the game process, transmits a return notification to management device 50A. Processor 51 of management device 51, having received the return notification, updates entitlement flag 541 so that there is a parent node entitlement. The parent node entitlement exercised by game terminal 10A is thus returned to management device 50A. As is obvious from the foregoing, entitlement flag 541 is data indicating whether a parent node entitlement can be exercised.

Effects:

As described in the foregoing, the maximum bandwidth required in a communication path can be minimized without reducing the degree of freedom in designing a predetermined game because the maximum number of game terminals 10 that can be selected at one time as a parent node in each communication group is limited to one according to the present embodiment. Furthermore, according to the present embodiment, the probability is reduced of a player group not being formed even after a predetermined time has elapsed since game terminal 10 has transmitted a grouping request, with the player group including game terminal 10 that has transmitted the request.

Furthermore, according to the embodiment, because it is certain that a parent node entitlement that has been transferred will be returned, chances of exercising the entitlement can be repeatedly provided to game terminals included in a communication group. Obviously, the transfer of a parent node entitlement is equivalent to the lending of a parent node entitlement. Therefore, entitlement flag 541 is data indicating whether a parent node entitlement is being lent.

Additionally, in the present embodiment, the returning of a parent node entitlement is performed immediately after a parent node entitlement becomes no longer necessary. For example, processor 11 of game terminal 10, having received a "not-needed" notification, immediately transmits a return notification to the responsible management device. In another example, processor 11 of game terminal 10 that has been selected as a parent node and has finished the game process immediately transmits a return notification to the responsible management device. Therefore, according to the present embodiment, the opportunities for one or more game terminals 10 to exercise a parent node entitlement are not wasted, the one or more game terminals being included in the same communication group as game terminal 10 that has returned a parent node entitlement.

Modifications:

The above-described embodiments can be modified as described in the following. These modifications are included in the scope of the invention.

For example, the number of parent node entitlements managed by management device 40 may be more than one. Specifically, entitlement flag 541 can be replaced by data capable of representing 3 or more values. In this modification, processor 51 of management device 50, upon receiving a transfer request, determines whether the number represented by the data is 1 or more, and, if the number is 1 or more, transmits the entitlement data to game terminal 10 that has transmitted the transfer request, updates the data so that the number represented by the data is reduced by 1, and updates the data so that the number represented by the data is increased by 1 upon receiving a return notification.

The modification is not limited to the above because entitlement flag 541 is data indicating the number of parent node entitlements that management device 50 has, as described in the foregoing. Thus, a game system 100 can be conceived in which processor 51 of management device 50 determines, upon receiving a transfer request, whether the memory content of rewritable memory 541 indicates whether there is 1 or more parent node entitlements, and if the number is 1 or more, transmits the entitlement data to game terminal 10 that has transmitted the transfer request, updates the memory content of rewritable memory 541 so that the number of parent node entitlements is reduced by 1, and updates the memory content of rewritable memory 541 so that the number of parent node entitlements is increased by 1 upon receiving a return notification.

Furthermore, for example, the above embodiment may be modified to a mode in which game terminal 10 concurrently serves as management device 50. Such a mode includes having a predetermined one of game terminals 10 of each communication group function as management device 50 corresponding to the communication group. Specifically, a communication address of game terminal 10 functioning as management device 50 corresponding to a communication group including game terminal 10 is stored in non-volatile memory 18 of each game terminal 10, and each game terminal 10 transmits a transfer request to game terminal 10 having the stored communication address.

Alternatively, game terminal 10 may concurrently serve as management device 50, for example, by having an arbitrary one of game terminals 10 function as a management device. Specifically, each game terminal 10 queries every game terminal 10 of a communication group in which game terminal 10 is included, before transmitting a transfer request, to identify the game terminal 10 that is functioning as management device 50 corresponding to the communication group and transmits the transfer request to the identified game terminal 10.

A method of realizing the mode of game terminal 10 concurrently serving as management device 50 can be, for example, having game terminal 10 serving as management device 50 execute a process providing the function of game terminal 10 and a process providing the function of management device 50 in parallel. In the mode realized by this method, the communication between management device 50 and game terminal 10, concurrently functioning as management device 50 will be the so-called "InterProcess Communication".

Furthermore, a modification may be made such that management device 50 is not provided, and game terminal 10 determines whether a grouping request containing ability data can be transmitted, i.e., whether a parent node entitlement can be exercised, without communicating with another device. There are various ways of realizing the determination as to whether a parent node entitlement can be exercised. For example, rewritable memory 19 of each game terminal 10 may store a flag indicating whether a parent node entitlement can be exercised so that processor 11 of game terminal 10 determines whether a parent node entitlement can be exercised based on the flag, and, in a case in which game terminal 10 starts exercising a parent node entitlement, game terminal 10 updates the flag stored in other game terminals 10 of a communication group in which game terminal 10 itself is included so that the flag shows that the exercise of a parent node entitlement is not possible.

Even furthermore, the number of communication nodes included in a player group may be modified to be four or more. Also, the number of game terminals included in a communication group may be modified to be between one and three, inclusive, or five or more, or may be modified so that the number varies among each communication group.

Furthermore, a server device may request that a game terminal play the game alone, or with two or more, even in a case in which the predetermined number of terminals cannot be grouped in one player group within the predetermined time period as a result of the matching process.

The invention claimed is:

1. A game system comprising:
   plural communication groups, each having been allocated different communication paths from one another and each including plural game terminals sharing the communication path allocated to the respective communication groups; and
   a server device that forms a player group of game terminals which will play a multiple-player game in a unit of a group by selecting, from among the plural game terminals of the plural communication groups, one game terminal as a parent node requiring a larger amount of bandwidth during a game and at least two game terminals as child nodes each requiring a smaller amount of bandwidth,
   each of the plural game terminals of the plural communication groups comprising:
   an inputter that receives an instruction input by a player;
   a grouping request transmitter that generates, upon a predetermined instruction being input via the inputter, a grouping request for requesting the forming of the player group and that transmits the grouping request to the server device;
   a player group data receiver that receives player group data indicating the configuration of the player group; and
   a controller that determines, on the basis of the player group data, whether the game terminal has been selected as a parent node and that controls communication during the game based on a result of the determination;
   the grouping request transmitter comprising:
   an entitlement determiner that determines, upon receiving the predetermined instruction, whether the game terminal can exercise entitlement to function as a parent node; and
   a generator that generates, in a case in which the entitlement determiner has determined that the exercise of the entitlement is possible, the grouping request containing ability data indicating that the game terminal has an ability to be selected as a parent node and that otherwise generates the grouping request not containing the ability data; the server device comprising:
   an ability detector that detects whether the grouping request contains the ability data upon receiving the grouping request;
   a selector that selects, as a parent node, a game terminal from among game terminals having transmitted the grouping request containing the ability data and that selects at least two game terminals as child nodes from among game terminals having transmitted the grouping requests other than the one game terminal selected as the parent node; and
   a player group data transmitter that transmits, to each of the game terminals configuring the player group grouped through the selection by the selector, the player group data of the player group.

2. A game system according to claim 1, further comprising:
   plural management devices respectively provided for each of the communication groups, with each management device having a communicator that communicates with each of the plural game terminals of a corresponding communication group,
   wherein the entitlement determiner of the game terminal comprises:
   a transfer requester that transmits, to the management device corresponding to a communication group containing the game terminal, a transfer request for requesting the transfer of the entitlement so as to determine whether the game terminal can exercise the entitlement; and
   an entitlement obtainer that receives entitlement data indicating that the game terminal has the entitlement, and
   wherein the entitlement determiner determines that the exercise of the entitlement is possible only in a case in which the entitlement obtainer receives the entitlement before a predetermined time has elapsed since the transmission of the transfer request,
   each of the plural management devices comprising:
   an entitlement storage device that indicates, from information in memory, the number of entitlements held by the management device;
   a transfer request receiver that receives the transfer request; and
   a transfer processor that, upon the transfer request receiver receiving the transfer request, determines whether the information in the memory of the entitlement storage indicates that there is at least one entitlement, that transmits the entitlement data to the game terminal having transmitted the transfer request in a case in which it is determined that there is at least one entitlement, and that updates the information in the memory of the entitlement storage so that the number of the entitlements held by the management device is reduced by 1.

3. A game system according to claim 2,
   wherein each of the game terminals of the plural communication groups further comprising a return notification transmitter that transmits a return notification notifying a return of the entitlement to a management device corresponding to a communication group including the game terminal in a case in which the entitlement is not necessary;

wherein each of the plural management devices comprises:

a return notification receiver that receives the return notification; and a return processor that, upon the return notification receiver receiving the return notification, updates the memory content of the entitlement storage so that the number of the entitlements held by the management device is increased by 1.

4. A game system according to claim 3, wherein the selector, upon receiving a grouping request containing the ability data, determines whether one game terminal has already been selected as a parent node, and transmits, in a case in which the parent node has already been selected, a "not-needed" notification indicating that the ability data is not needed by a game terminal that has transmitted the grouping request;

wherein each of the plural game terminals of the plural communication groups comprises a "not-needed" notification receiver that receives the "not-needed" notification; and wherein the return notification transmitter, upon the "not-needed" notification receiver receiving the "not-needed" notification, that transmits a return notification for notifying the return of the entitlement to a management device corresponding to a communication group containing the game terminal.

5. A game system according to claim 1, wherein the server device forms the player group sequentially one by one and selects a predetermined number of the game terminals as the child nodes, wherein, the selector comprises:

a main selector that, upon receiving the grouping request containing the ability data, selects the game terminal having transmitted the grouping request as a parent node of a player group that is to be formed at an earliest timing from among ungrouped player groups in a case in which no game terminal has been selected as a parent node of the earliest-to-be-formed player group and that selects, in a case in which a game terminal has been selected as a parent node of the earliest-to-be-formed player group, the transmitter game terminal as a parent node of a player group that is to be formed at an earliest timing from among player groups for each of which no game terminal as a parent has been selected, whereas in a case in which the grouping request does not contain the ability data, that selects the transmitter game terminal as a child node of a player group to be formed at an earliest timing from among ungrouped player groups if a selection number of the earliest-to-be-formed player group is smaller than the predetermined number, with the selection number indicating a number of game terminals already selected as child nodes of a player group and that selects, in a case in which the selection number is not smaller than the predetermined number, the transmitter game terminal as a child node of a player group that is to be formed at an earliest timing from among player groups for which the selection number is smaller than the predetermined number; and a secondary selector that, when a predetermined time has lapsed since a grouping request was received for the first time from a game terminal that has been selected as a parent node or a child node of a player group to be formed at an earliest timing from among ungrouped player groups, with the grouping request having caused the selection, in a case in which the selection number of the earliest-to-be-formed player group is smaller than the predetermined number and in which a number of game terminals that have been selected as a parent node of another player group to be formed after the earliest-to-be-formed player group is larger than a difference obtained by deducting the selection number from the predetermined number, selects, from among the game terminals that have been selected as a parent node of another player group to be formed after the earliest-to-be-formed player group, a game terminal of the number corresponding to the difference as child nodes of the earliest-to-be-formed player group from among ungrouped player groups.

* * * * *